United States Patent [19]
> Burckhardt

[11] 3,798,827
[45] Mar. 26, 1974

[54] SELF-SETTING TRAP
[76] Inventor: August H. Burckhardt, Balaton, Minn. 56115
[22] Filed: Mar. 12, 1973
[21] Appl. No.: 340,543

Related U.S. Application Data
[63] Continuation-in-part of Ser. No. 201,789, Nov. 24, 1971, abandoned.

[52] U.S. Cl. .................................. 43/95, 43/83
[51] Int. Cl. .................................. A01m 23/26
[58] Field of Search ........... 43/95, 93, 92, 88, 83.5, 43/82, 83

[56] References Cited
UNITED STATES PATENTS
| 188,753 | 3/1877 | Pownall et al. | 43/95 |
| 424,792 | 4/1890 | Kelley | 43/93 |
| 611,749 | 10/1898 | Davis | 43/82 |
| 2,250,639 | 7/1941 | Kurkjian | 43/83.5 |

Primary Examiner—Warner H. Camp
Attorney, Agent, or Firm—Merchant, Gould, Smith & Edell

[57] ABSTRACT

A pair of cooperating jaw elements are pivotally mounted on a base for movements from a set position to a tripped position under the bias of a spring. A treadle arm pivotally mounted on the base for movements between a set position and a tripped position includes a hook portion which engages one of the jaw elements to maintain the position of the jaw elements and a spring arm mounted on the treadle arm is initially engaged by the jaw element during its movements toward the set position to automatically move the treadle arm to its set position to set the trap 6 Claims, 4 Drawing Figures

SELF-SETTING TRAP

This is a continuation-in-part of my pending application entitled "Self-Loading Trap," filed Nov. 24, 1971, under Ser. No. 201,789, and now abandoned.

In my earlier application, I disclose an animal trap in which a treadle arm is automatically moved to a set position, responsive to movement of a jaw element to a set position, without manual manipulation of the treadle arm during the trap setting operation. The invention resides in a spring member engageable by a jaw element of the trap as the jaw element moves to the set position. The invention represents a significant advance in animal traps through its simple operation and elimination of the hazardous setting operations of prior known traps.

The present application discloses an animal trap which includes an improved structure for automatically moving the treadle arm to a set position during the setting operation of the animal trap.

Known animal traps of the type employing cooperating jaw elements pivotally mounted on a base for movements from set positions to tripped positions under the bias of a spring, are normally set by first compressing the spring and thereafter moving the jaw elements to a set position. A hook portion of a treadle arm is then brought into engagement with one of the jaw members by the fingers of an operator and the spring is released to position the treadle arm and the jaw elements in a set position. This has traditionally been an awkward and hazardous operation and the cause of numerous accidents because the operator must not only compress the spring with his foot but also manipulate the jaw elements as well, while setting the treadle arm with his fingers.

The present invention provides an animal trap of the above type in which the jaw element which is engaged by the hook portion on the treadle arm first engages a spring member mounted on the treadle arm. Continued movement of the jaw elements to their set positions forces the hook portion to a position wherein the jaw member is frictionally engaged between the hook portion and the spring member to retain the treadle arm in its set position, and thus the jaw element in its set position, until sufficient forces are exerted on the end of the treadle arm spaced from the hook portion to overcome the frictional engagement of the jaw element with the hook portion.

A primary object of the present invention is the provision of a self-loading trap in which the treadle arm is constructed to automatically assume a set position upon movement of a jaw element to a set position.

Another object of the present invention is the provision of a device of the class above described which is safe, extremely inexpensive to produce and durable through extended periods of use.

These and other important objects will become apparent to those skilled in the art upon consideration of the following specification, drawings and claims.

BRIEF DESCRIPTION OF THE DRAWINGS

Referring to the drawings, wherein like reference numerals indicate like parts throughout the views.

DESCRIPTION OF THE PREFERRED EMBODIMENT

Figure 1:
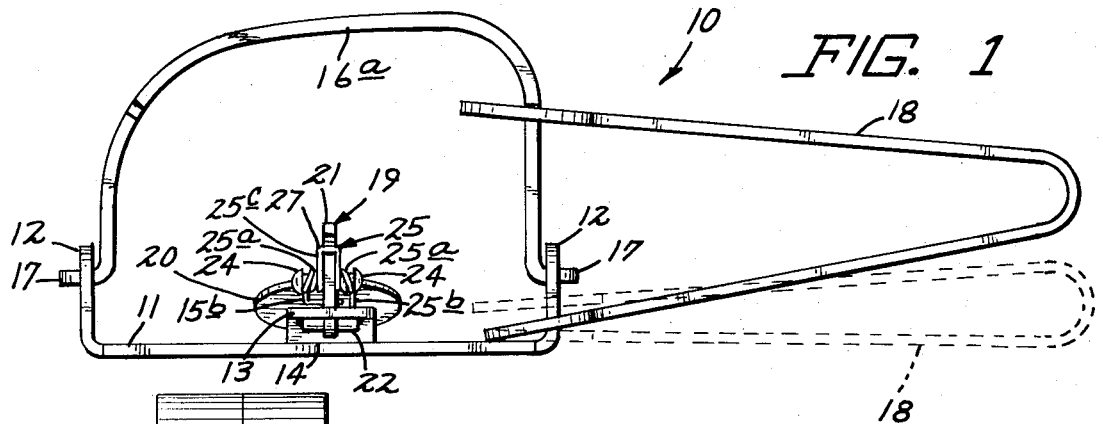
FIG. 1 is a side elevational view of a self-setting animal trap constructed in accordance with the present invention.
Figure 2:
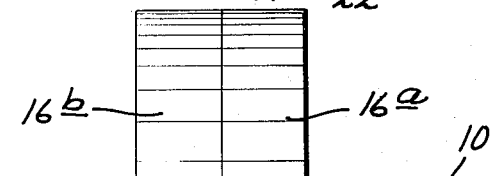
FIG. 2 is an end elevational view on an enlarged scale as seen from left to right of the structure of FIG. 1.
Figure 3:
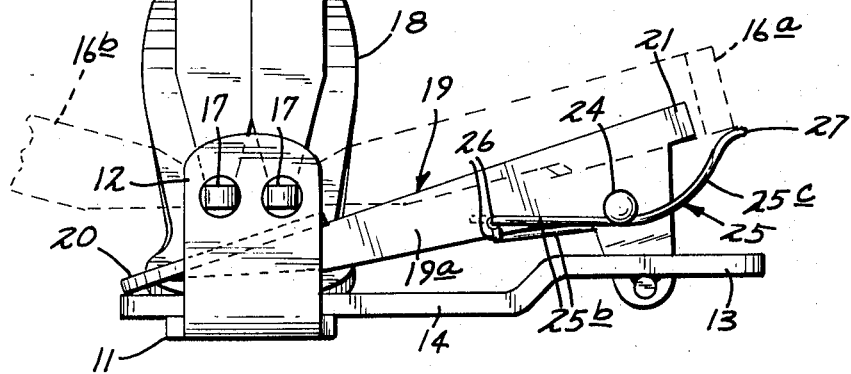
FIG. 3 is a fragmentary plan view of a portion of the structure of FIG. 2.
Figure 4:
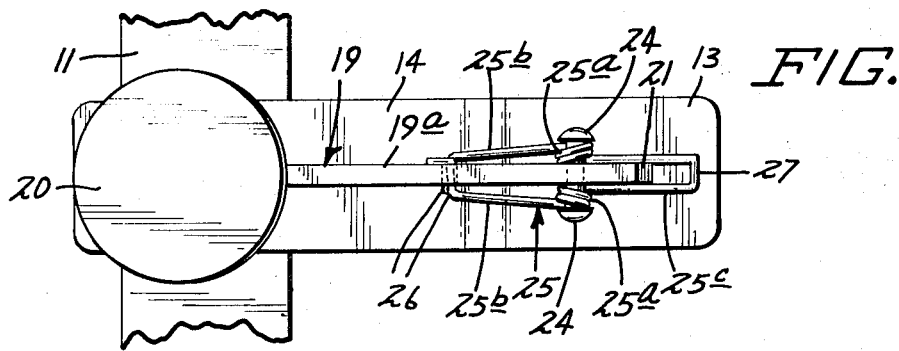
FIG. 4 is a view similar to FIG. 2 showing a different position of the parts thereof, portions being broken away and shown in section.

Referring to the drawings, FIG. 1 illustrates a trap constructed in accordance with the present invention which is generally indicated by the numeral 10. Trap 10 includes a base 11 formed with upturned ears or brackets 12. A treadle bracket 13 is formed at the far end of an arm 14 extending from the base 11. A pair of cooperating jaw elements 16a, 16b are pivotally mounted on the ears or brackets 12, as indicated at 17, for movements between a first generally planar set position and a second generally side-by-side tripped position. The former position is illustrated in FIG. 4 of the drawings while the latter position is illustrated in FIGS. 1 and 2. The jaw elements 16a, 16b are biased from the first position toward the second position by spring means 18 in a manner identical with conventional animal traps as they are now produced.

A treadle arm 19 includes a plate or pan 20 fixed to an arm portion 19a at one end and includes a hook portion 21 at the other end. Arm portion 19a overlies the base 11 laterally inwardly of a pivotal connection 22 of the treadle arm 19 on the bracket portion 13. Hook portion 21 extends laterally outwardly with respect to the pivotal connection 22. With this arrangement of parts, the hook portion 21 is movable out of the path of travel of one of the jaw elements 16a, 16b (in this case, jaw element 16b) during pivotal movement of the jaw element 16b from the second tripped position to the first generally planar set position, and is pivotally movable to a set position wherein the hook portion 21 is disposed in the path of travel of the jaw element 16b in overlying relation thereto to retain the jaw elements 16a, 16b in their first set position against the bias of the spring means 18.

In conventional traps, such as those employing structure generally similar to that above described, an operator must physically manipulate the treadle arm 19 to cause it to assume a set position, as well as perform the numerous other steps necessary to set the trap 10. In order to eliminate this ever awkward and often hazardous operation in the trap setting process, a spring-biased arm means 25 is affixed to the treadle arm 19. Arm means 25 is formed from a wire-like spring element having coiled portions 25a disposed on opposite sides of the treadle arm and wound about a pin or the like 24 extending from the opposite sides of the treadle arm 19. An arm member 25b extends from each of the coiled spring portions 25a and is anchored on the treadle arm 19 as at 26. Spring element 25 further includes portions 25c which extend from the coiled spring portions 25a outwardly into the path of travel of the jaw element 16b when the treadle arm 19 is in the tripped position illustrated in FIG. 2. A bight or connecting portion 27 secures the outer ends of the portions 25c together.

When it is desired to set the trap 10, an operator first compresses the spring means 18 with his foot to the dotted line position of FIG. 1. Thereafter, the jaw elements 16a, 16b are grasped with his hands and moved toward the dotted line positions of FIG. 2. As can be seen in FIG. 2, this causes the jaw element 16a to follow a path of travel outwardly of the hook portion 21 so as to engage the outer end of the portions 25c of spring element 25. Continued movement of the jaw members 16a, 16b toward their set positions causes the treadle arm 19 to pivot clockwise on the pivotal connection 22 until the outer end of the hook portion 21 engages an adjacent inner surface of the jaw element 16a. Further movement of the jaw element 16a, without pivotal movement of the treadle arm 19, is permitted by the spring element 25. As the jaw element 16a reaches the full line set position of FIG. 4, the treadle arm 19 snaps into a position wherein the hook portion 21 thereof is in an overlying relationship to the jaw element 16a. This set position of the treadle arm 19 is maintained in the final trap setting operation of releasing the spring means 18 without physical manipulation of the treadle arm 19 by the fingers of the operator. The treadle arm 19 remains in the set condition of FIG. 4 during the final operation of setting the trap 10 because the outer ends of the portions 25c of spring element 25 are spaced from the hook portion 21 a distance such that frictional engagment of the jaw element 16a between the hook portion 21 and spring portion 25c occurs in this set condition. A downward force (generally equal to that needed for conventional traps of this type) exerted on the pan 20 is sufficient to overcome the frictional engagement of the jaw 16a by the spring element 25, as well as that caused by the spring 18, to release the trap 10 to its tripped condition of FIG. 2.

While I have shown and described a trap utilizing opposed jaw elements 16a, 16b, it will be recognized by those skilled in the art that other traps employing other jaw structures, as well as jaw-base combinations, will operate equally as well as long as a treadle arm construction of the type herein disclosed is utilized to set and trip the trap.

I claim:

1. A self-setting trap comprising:
   a. a base;
   b. a generally U-shaped jaw element pivotally mounted at the ends thereof on said base for pivotal movements about a first axis between a set position and a tripped position;
   c. means biasing said jaw element toward said tripped position;
   d. a treadle arm extending perpendicular to said first axis and pivotally connected to said base for pivotal movements about a second axis extending parallel to said first axis between a tripped position and a set position engaging and holding said jaw element in said set position;
   e. a hook portion on said jaw element disposed out of the path of travel of said jaw element from said tripped position to said set position; and
   f. spring-biased arm means carried by and projecting from said treadle arm beyond said hook portion and engageable by said jaw element to simultaneously move said treadle arm and spring-biased arm means to the set position during movements of said jaw element to its set position, said hook portion overlying said jaw element and said spring-biased arm means underlying said jaw element in said set position.

2. The structure of claim 1 wherein said spring biased arm means is spaced from said hook portion a distance such that frictional engagement of said jaw element therebetween occurs in said set position.

3. The structure of claim 1 wherein said spring-biased arm means is a wire-like spring element disposed in the path of travel of said jaw element from said tripped position to said set position to thereby pivot said treadle arm to its set position upon said travel of said jaw element.

4. The structure of claim 3 wherein said spring element is constructed and arranged to bias said jaw element against said hook portion in the set position of said jaw element.

5. A self-setting trap comprising:
   a. a base;
   b. a pair of cooperating jaw elements mounted on said base for pivotal movements between a first generally planar set position and a second generally side-by-side tripped position;
   c. spring means biasing said jaw elements from said first position toward said second position;
   d. a treadle arm pivotally mounted on said base having a hook portion extending laterally outwardly with respect to the pivotal connection thereof and an arm portion overlying said base laterally inwardly of the pivotal connection thereof;
   e. said hook portion being pivotally moved out of the path of travel of one of said jaw elements during movement of said one jaw element from said second position to said first position and being pivotally movable to a second position to retain said jaw elements in said first position against the bias of said spring means; and
   f. spring-biased arm means carried by and projecting from said treadle arm beyond said hook portion and disposed in the path of travel of said one jaw element to simultaneously pivot said treadle arm to a position to retain said jaw elements in said first position upon engagement by and movement of said one jaw element from said second position to said first position.

6. A self-setting trap comprising:
   a. a base;
   b. a jaw element pivotally mounted on said base for movements between a set position and a tripped position;
   c. means biasing said jaw element toward said tripped position;
   d. a treadle arm pivotally connected to said base for movements between a tripped position and a set position engaging and holding said jaw element in said set position;
   e. a hook portion on said treadle arm disposed out of the path of travel of said jaw element from said tripped position to said set position;
   f. spring-biased arm means carried by and projecting from said treadle arm beyond said hook portion and engageable by said jaw element to simultaneously move said treadle arm and spring-biased arm means to the set position during movements of said jaw element to its set position, said hook portion overlying said jaw element and said spring-biased arm means underlying said jaw element in said set position; and
   g. said spring-biased arm means being biased toward said hook portion and being spaced from said hook portion a distance such that frictional engagement of said jaw element between said hook portion and said spring-biased arm means occurs in said set position of said jaw element and spring-biased arm means.

* * * * *